Figure 1:
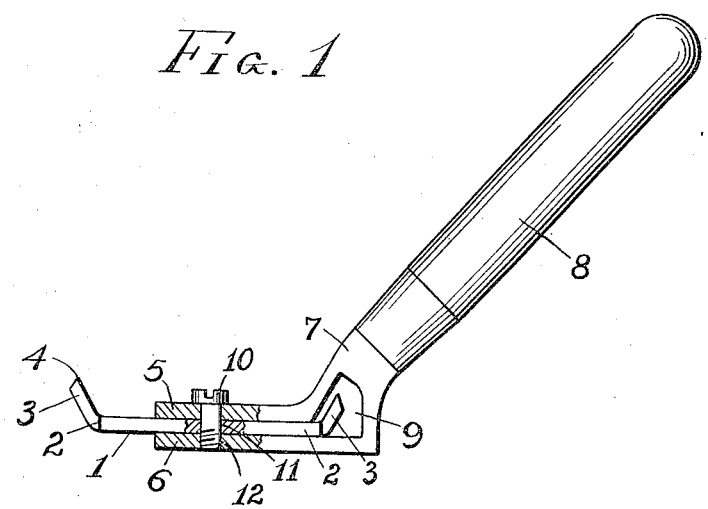

F. J. VLCHEK.
MORTAR JOINT SCRAPER.
APPLICATION FILED FEB. 21, 1916.

1,195,297.

Patented Aug. 22, 1916.

Inventor
Frank J. Vlchek
By G. E. Dunstan
his Attorney

UNITED STATES PATENT OFFICE.

FRANK J. VLCHEK, OF CLEVELAND, OHIO.

MORTAR-JOINT SCRAPER.

1,195,297.
Specification of Letters Patent.
Patented Aug. 22, 1916.

Application filed February 21, 1916. Serial No. 79,495.

*To all whom it may concern:*

Be it known that I, FRANK J. VLCHEK, a citizen of the United States, residing at Cleveland, in the county of Cuyahoga and State of Ohio, have invented certain new and useful Improvements in Mortar-Joint Scrapers, of which the following is a specification.

This invention relates to improvements in a tool for bricklayers, and has for its main object to provide a handy tool for removing the mortar in the joints between bricks before it becomes hard so as to leave the mortar below the faces of the bricks. The tool is also adapted to scrape the excess mortar from the faces of the bricks at the same time that it removes the mortar from the joints, and the scraping blade of the tool also serves as a guide for making the joints a uniform depth.

Another object of the invention is to provide a tool capable of being quickly adjusted to suit different widths and depths of joints between the bricks.

With the above and other objects in view as will be readily understood, the invention will be hereinafter fully described in connection with the accompanying drawings forming a part of this specification, and the novel features thereof will be distinctly pointed out in the appended claims.

In the drawings like characters of reference indicate corresponding parts.

Figure 2:
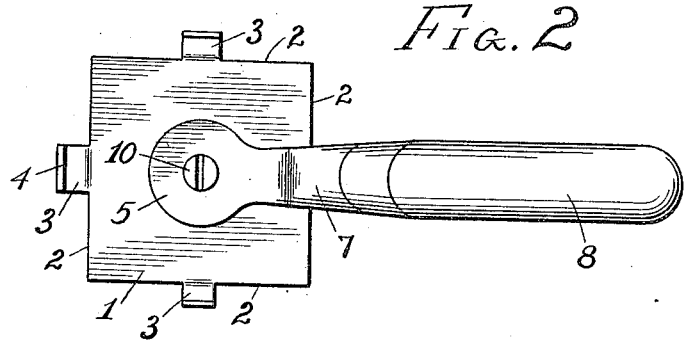
Figure 3:
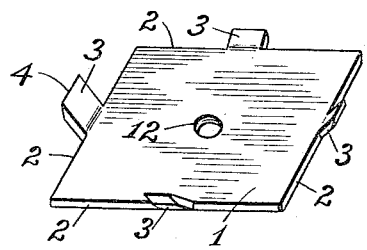

Figure 1 is a side or edge view of the tool embodying my invention, Fig. 2 is a plan view of the same, and Fig. 3 is a perspective view of the blade.

In the drawings, 1 represents a blade which is preferably square in outline. Formed integrally with the blade and located centrally upon each edge 2 thereof are scraper fingers 3, which project outwardly at an angle from the blade. The front ends of said scraper fingers are beveled to leave sharp scraping edges 4. The scraper fingers are made in various widths so as to be adaptable for removing mortar from between bricks laid different distances apart, and they also vary in length for the purpose of making the joints corresponding distances below the faces of the bricks. The edges 2 of the blade not only scrape the mortar from the faces of the bricks adjacent the joints, but also serve as guides for the scraper fingers, which in practice penetrate the joints their full length from the edges of the blade. Said blade is held between a pair of similar clamping arms 5 and 6, formed integrally with a shank 7, which extends upwardly and then longitudinally with relation to said arms at an angle therefrom in the same outward direction as the scraper fingers of the blade. A suitable handle 8 is fixed to the shank 7 for operating the tool. Said shank is provided with a recess, as shown at 9, for accommodating the scraper fingers 3 of the blade. In order to be able to adjust the blade with the desired scraping finger in proper working position, and also for securely clamping the blade between the arms 5 and 6, a set screw 10 is employed. This set screw passes through an opening in the clamping arm 5, through a central aperture 11 in the blade, and enters the threaded opening 12 of the other clamping arm 6.

It is thought that the method of using the mortar joint scraper herein set forth and described will be fully understood and its merits appreciated without further explanation.

While the tool shown embodies my invention, it will be understood that slight changes in the details of construction may be made within the scope of the claims.

Having fully described my invention, what I claim is:

1. A mortar joint scraper comprising a blade of plate material, scraper fingers projecting from the edges of the blade, and a handle supporting the blade whereby the blade takes a vertical position with relation to the face of a wall and the edges of the blade serve as scrapers and guides, substantially as described.

2. A mortar joint scraper comprising a blade having a plurality of edges, scraper fingers projecting from the edges of the blade, the scraper fingers being arranged at an angle with relation to the blade, a handle for supporting the blade, and the handle extending at an angle with relation to the blade and at the same side thereof as the scraper fingers, substantially as described.

3. A mortar joint scraper comprising a blade having a plurality of edges, scraper fingers projecting from the edges of the blade, the scraper fingers being of different widths and lengths, a handle, the blade being rotatably supported by the handle whereby the blade may be turned to bring any one of said fingers into working position, and means for clamping the blade to the handle in a set position, substantially as described.

4. A mortar joint scraper comprising a blade having a plurality of edges, scraper fingers projecting at an angle from the edges of the blade, a handle for supporting the blade, means for clamping the blade to the handle in an adjusted position, and the handle being arranged at an angle with relation to the blade, substantially as described.

5. A mortar joint scraper comprising a blade having a plurality of edges, scraper fingers projecting at an angle from the edges of the blade, clamping arms for holding the blade, a shank formed integrally with the clamping arms and extending at an angle therefrom, a handle fixed to the shank, the shank being provided with a recess for accommodating said scraper fingers, and a set screw passing through one of the clamping arms and the blade and being threaded in the other clamping arm, substantially as described.

In testimony whereof I affix my signature.

FRANK J. VLCHEK.

Copies of this patent may be obtained for five cents each, by addressing the "Commissioner of Patents, Washington, D. C."